(12) United States Patent
Kwon

(10) Patent No.: US 11,794,672 B2
(45) Date of Patent: Oct. 24, 2023

(54) APPARATUS AND METHOD FOR CONTROLLING VEHICLE

(71) Applicants: HYUNDAI MOTOR COMPANY, Seoul (KR); Kia Corporation, Seoul (KR)

(72) Inventor: Hae Yun Kwon, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 6 days.

(21) Appl. No.: 17/545,273

(22) Filed: Dec. 8, 2021

(65) Prior Publication Data

US 2022/0402447 A1 Dec. 22, 2022

(30) Foreign Application Priority Data

Jun. 17, 2021 (KR) .................. 10-2021-0078828

(51) Int. Cl.
| | | |
|---|---|---|
| *B60R 16/023* | (2006.01) | |
| *B60W 50/04* | (2006.01) | |
| *H04L 12/40* | (2006.01) | |
| *B60W 10/26* | (2006.01) | |

(52) U.S. Cl.
CPC ........... *B60R 16/023* (2013.01); *B60W 10/26* (2013.01); *B60W 50/045* (2013.01); *H04L 12/40* (2013.01); *B60W 2710/24* (2013.01); *H04L 2012/40273* (2013.01)

(58) Field of Classification Search
CPC ......... B60W 40/114; B60W 2420/905; B60W 2520/16; B60W 2520/18; G06F 18/25
See application file for complete search history.

(56) References Cited

U.S. PATENT DOCUMENTS

| | | | | |
|---|---|---|---|---|
| 2020/0387605 | A1* | 12/2020 | Gilad | G06F 21/55 |
| 2021/0167988 | A1* | 6/2021 | Harata | H04L 67/06 |
| 2022/0001835 | A1* | 1/2022 | Kim | G06F 1/3296 |

* cited by examiner

*Primary Examiner* — Tyler J Lee
*Assistant Examiner* — Yufeng Zhang
(74) *Attorney, Agent, or Firm* — MORGAN, LEWIS & BOCKIUS LLP

(57) ABSTRACT

An apparatus of controlling a vehicle may include a sensor that obtains state information of the vehicle, a plurality of controllers that operate in at least one communication domain, and a processor that detects a first controller that wakes up first among the plurality of controllers, wherein the processor is configured to determine whether to cut off power of the first controller according to whether the first controller is in a normal wake-up state based on the state information of the vehicle and whether the first controller is in a normal sleep state based on a sleep entry time of a communication domain.

14 Claims, 3 Drawing Sheets

APPARATUS AND METHOD FOR CONTROLLING VEHICLE

CROSS-REFERENCE TO RELATED APPLICATION

The present application claims priority to Korean Patent Application No. 10-2021-0078828, filed on Jun. 17, 2021, the entire contents of which is incorporated herein for all purposes by this reference.

BACKGROUND OF THE INVENTION

Field of the Invention

The present invention relates to an apparatus and a method for controlling a vehicle.

Description of Related Art

Recently, as connected technology has been developed, it is possible to share information by connecting a vehicle and a vehicle or a vehicle and a terminal through a network. To this end, various controllers are added to the interior of a vehicle, and communication protocols for various domains such as CAN FD communication, CAN communication, Ethernet communication, and the like are applied for the operations of the controllers in the vehicle.

When a vehicle is turned off, the network may enter the sleep mode under different conditions for each domain, and may wake up under a specific condition. However, when the network does not normally sleep after the vehicle is turned off, the controller operating in each domain wakes up abnormally even if there are specific conditions. Such an abnormally wake-up controller may unnecessarily cause a battery to be discharged after the vehicle is turned off.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling a vehicle capable of solving a problem in which a battery is unnecessarily discharged by a controller which is abnormally woken up after the vehicle is turned off.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an apparatus of controlling a vehicle includes a sensor that obtains state information of the vehicle, a plurality of controllers that operate in at least one communication domain, and a processor that detects a first controller that wakes up first among the plurality of controllers, wherein the processor is configured to determine whether to cut off power of the first controller according to whether the first controller is in a normal wake-up state based on the state information of the vehicle and whether the first controller is in a normal sleep state based on a sleep entry time of a communication domain.

One controller of the plurality of controllers may transmit a network management (NM) message to another controller that operates in a same communication domain as a communication domain in which the one controller operates.

The NM message may include a message counter value set to a predetermined value when the one controller first transmits the NM message to the another controller.

The processor may detect the one controller as the first controller when the message counter value set to the predetermined value is included in the NM message transmitted from the one controller to the another controller.

The processor may determine whether the state information of the vehicle is changed for a predetermined time after the vehicle is turned off when the first controller is detected.

The processor may determine that the first controller is in the normal wake-up state when the processor determines that the state information of the vehicle is changed for a predetermined time after the vehicle is turned off.

The processor may determine that the first controller is in an abnormal wake-up state when the processor determines that the state information of the vehicle is not changed for a predetermined time after the vehicle is turned off.

The processor may determine whether the sleep entry time of the communication domain exceeds the predetermined time when the processor concludes that the first controller is in the abnormal wake-up state.

The processor may determine that the first controller is in the normal sleep state when the processor determines that the sleep entry time of the communication domain does not exceed the predetermined time.

The processor may determine that the first controller is in an abnormal sleep state when the processor determines that the sleep entry time of the communication domain exceeds the predetermined time.

The processor may determine to cut off the power of the first controller when the processor determines that the first controller is in the abnormal sleep state.

According to various aspects of the present invention, a method of controlling a vehicle includes detecting a first controller that wakes up first among a plurality of controllers that operates in at least one communication domain, determining whether the first controller is in a normal wake-up state based on state information of the vehicle, determining whether the first controller is in a normal sleep state based on a sleep entry time of the communication domain, and determining whether to cut off power of the first controller based on whether a wake-up state of the first controller is a normal state and whether the first controller is a sleep state.

One controller of the plurality of controllers may transmit a network management (NM) message to another controller that operates in a same communication domain as a communication domain in which the one controller operates.

The detecting of the first controller may include detecting the one controller as the first controller when a message counter value set to a predetermined value is included in the NM message transmitted from the one controller to the another controller.

The determining of whether the first controller is in the normal wake-up state may include:

determining that the first controller is in the normal wake-up state when the processor determines that the state information of the vehicle is changed for a predetermined time after the vehicle is turned off.

The determining of whether the first controller is in the normal wake-up state may include:

determining that the first controller is in an abnormal wake-up state when the processor determines that the state information of the vehicle is not changed for a predetermined time after the vehicle is turned off.

The determining of whether the first controller is in the normal sleep state may include determining whether the sleep entry time of the communication domain exceeds the predetermined time when the processor concludes that the first controller is in the abnormal wake-up state.

The determining of whether the first controller is in the normal sleep state may include determining that the first controller is in the normal sleep state when the processor determines that the sleep entry time of the communication domain does not exceed the predetermined time.

The method may further include determining that the first controller is in an abnormal sleep state when the processor determines that the sleep entry time of the communication domain exceeds the predetermined time.

The determining of whether to cut off the power of the first controller may include determining to cut off the power of the first controller when the processor determines that the first controller is in the abnormal sleep state.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
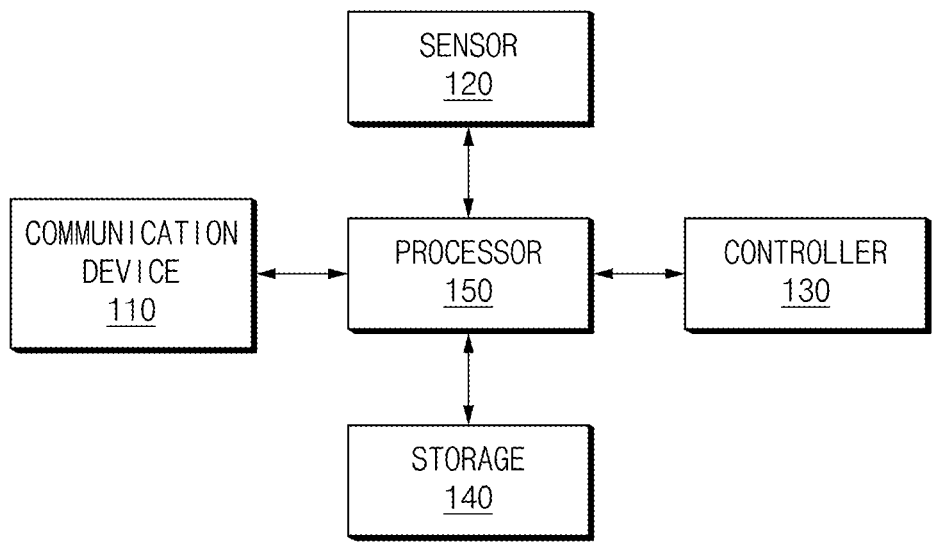
FIG. 1 is a block diagram illustrating the configuration of an apparatus of controlling a vehicle according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating the configuration of an apparatus of controlling a vehicle according to various exemplary embodiments of the present invention.

As shown in FIG. 1, an apparatus 100 for controlling a vehicle may include a communication device 110, a sensor 120, a controller 130, storage 140, and a processor 150.

The communication device 110 may perform communication in at least one communication domain, and may allow a plurality of controllers 130 to operate in each communication domain. According to various exemplary embodiments of the present invention, at least one communication domain may include CAN FD, CAN, and Ethernet. In the CAN FD communication domain, G-CAN FD communication, P-CAN FD communication, C-CAN FD communication, and I-CAN FD communication may be performed. In the CAN communication domain, M-HS CAN communication and B-HS CAN communication may be performed. In the Ethernet communication domain, controllers such as a display device controller, an autonomous driving controller, an autonomous parking controller, and the like may perform Ethernet communication.

The sensor 120 may obtain state information of a vehicle. According to various exemplary embodiments of the present invention, the state information of the vehicle may include information about as door open, door lock, trunk open, hood open, driver accommodated, passenger accommodated, vehicle speed, engine state, whether a remote service is used, whether a welcome light is used, over the air (OTA), and the like. The sensor 120 may include a door sensor, a trunk sensor, a hood sensor, a seat sensor, a speed sensor, an illuminance sensor, and the like to obtain the state information of the vehicle.

The controller 130 may operate in at least one communication domain. According to various exemplary embodiments of the present invention, the controller 130 may communicate and operate in a communication scheme preset in each communication domain. The plurality of controllers 130 may be provided for each communication domain.

According to various exemplary embodiments of the present invention, a plurality of controllers operating in the same communication domain may transmit NM messages to each other. A message counter value may be included in the NM message, and a message counter value set to a specified value (e.g., '1') may be included in a message first transmitted in the same communication domain.

According to various exemplary embodiments of the present invention, a plurality of controllers may transmit an AUTOSAR NM message in the CAN FD domain. The plurality of controllers may transmit an OSEK NM message in the CAN domain. The plurality of controllers may transmit an Eth NM message in the Ethernet domain.

The storage 140 may store at least one algorithm for performing determination or execution of various commands for the operation of an apparatus of controlling a vehicle according to various exemplary embodiments of the present invention. Furthermore, when the processor 150 determines that the wake-up state of the controller is abnormal, the storage 140 may store the state information of the vehicle obtained by the sensor 120. Furthermore, the controller 130 may store information about the controller which is determined as in an abnormal wake-up state and information about the controller in a non-sleep state. The storage 140 may include at least one storage medium of a flash memory, a hard disk, a memory card, a read-only memory (ROM), a random access memory (RAM), an electrically erasable programmable read-only memory (EEPROM), a programmable ROM (PROM), a magnetic memory, a magnetic disk, and an optical disk.

The processor 150 may be implemented by various processing devices such as a microprocessor in which a semiconductor chip configured for performing operations or execution of various commands is embedded, and may control the operations of an apparatus of controlling a vehicle according to various exemplary embodiments of the present invention. In detail, the processor 150 may detect the first controller that wakes up first among the plurality of controllers, and determine whether to cut off the power of the first controller based on results of determining the wake-up state of the first controller based on the state information of the vehicle and determining the sleep state of the first controller based on the sleep entry time in the communication domain.

The processor 150 may detect the first controller that wakes up first among the plurality of controllers based on a network management (NM) message transmitted in the same communication domain. According to various exemplary embodiments of the present invention, by use of the feature that the message counter value in the NM message is set to a specified value (e.g., '1) when one controller transmits the NM message to another controller for the first time, the processor 150 may detect one controller as the first controller and store information about the first controller when the message counter value set to the specified value is included in the NM message.

According to various exemplary embodiments of the present invention, the processor 150 may detect the first controller which is woken up first by monitoring the AUTOSAR NM message transmitted between the plurality of controllers in the CAN FD domain. Furthermore, the processor 150 may detect the first controller which is woken up first by monitoring the OSEK NM message transmitted between the plurality of controllers in the CAN domain. Furthermore, the processor 150 may detect the first controller which is woken up first by monitoring the Eth NM message transmitted between the plurality of controllers in the Ethernet domain.

When the first controller which is woken up first is detected, the processor 150 may determine whether the state information of the vehicle is changed for a specified time (time set in a timer, e.g., 10 minutes) after the vehicle is turned off. The processor 150 may determine whether the states of door open, door locked, trunk open, hood open, driver accommodated, passenger accommodated, vehicle speed, engine, remote service, welcome light, OTA, and the like have changed for a specified time.

The processor 150 determines that the wake-up of the first controller is a normal wake-up when it is determined that the first controller which is woken up first is detected and the state information of the vehicle is changed for a specified time after the vehicle is turned off. When the first wake-up is a normal wake-up, the processor 150 may perform normal communication without storing wake-up state information.

When it is determined that the first controller which is woken up first is detected and the state information of the vehicle is not changed for a specified time after the vehicle is turned off, the processor 150 may determine that the wake-up of the first controller is an abnormal wake-up.

When it is determined that the wake-up of the first controller is an abnormal wakeup, the processor 150 may determine whether the sleep entry time of the communication domain exceeds a specified time. In the instant case, the communication domain for determining the sleep entry time may include a domain in which the first controller operates. The processor 150 may determine whether the communication domain is in a normal sleep state based on whether the sleep time of the communication domain exceeds a specified time.

When it is determined that the sleep time of the communication domain does not exceed a specified time, the processor 150 may determine that the communication domain is not in a normal sleep state, where the communication domain may determine that the first controller is in a normal sleep state because the communication domain includes a domain in which the first controller operates. Meanwhile, when it is determined that the sleep time of the communication domain exceeds a specified time, the processor 150 may determine that the first controller is in an abnormal sleep state (non-sleep state).

When it is determined that the first controller is in an abnormal sleep state, the processor 150 may determine to cut off power of the first controller to discharge the battery.

When it is determined that the first controller is in an abnormal wake-up state or an abnormal sleep state, the processor 150 may store information related to the first controller in an abnormal wake-up state, information related to the first controller in an abnormal sleep state, and vehicle state information. As described above, by storing the information of the first controller in the abnormal wake-up state, the information of the first controller in the abnormal sleep state, and the vehicle state information, the processor 150 may rapidly identify the cause of battery discharge when a battery discharge problem occurs.

Figure 2:
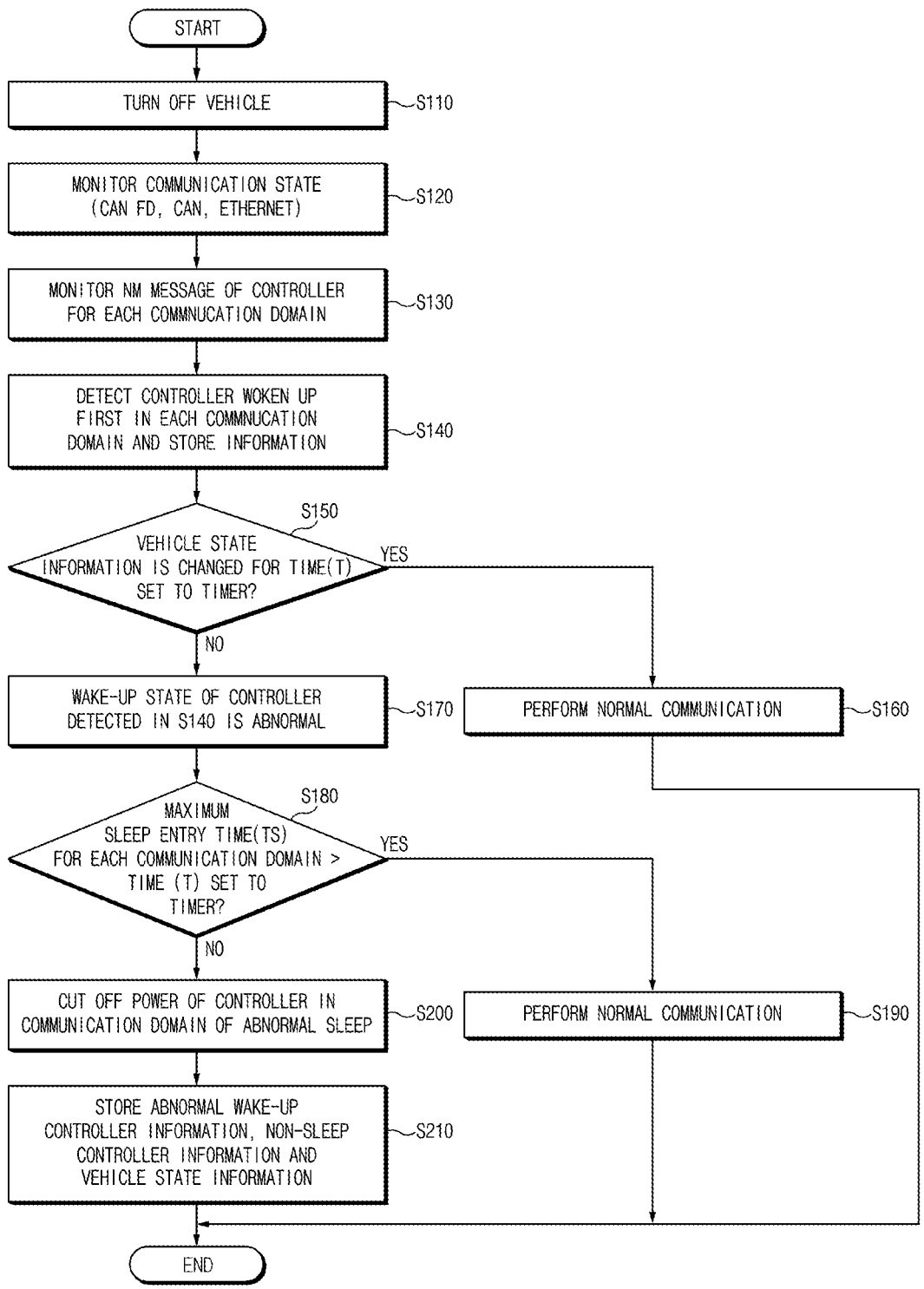
FIG. 2 is a flowchart illustrating a method of controlling a vehicle according to various exemplary embodiments of the present invention.

FIG. 2 is a flowchart illustrating a method of controlling a vehicle according to various exemplary embodiments of the present invention.

As shown in FIG. 2, in S120, the processor 150 may determine the communication state of the communication domain when it is determined in S110 that the vehicle is turned off. In the instant case, the communication domain may include CAN FD, CAN, Ethernet, and the like.

In S130, the processor 150 may monitor the NM message of a controller for each communication domain. In S130, the processor 150 may monitor the AUTOSAR NM message transmitted between the plurality of controllers in the CAN FD domain. Furthermore, the processor 150 may monitor the OSEK NM message transmitted between the plurality of controllers in the CAN domain. Furthermore, the processor 150 may monitor the Eth NM message transmitted between the plurality of controllers in the Ethernet domain.

In S140, the processor 150 may detect the first controller which is woken up first for each communication domain and store information related to the first controller. In S140, the processor 150 may detect the first controller that wakes up first among the plurality of controllers operating in each communication domain, based on the NM message transmitted within the same communication domain. According to various exemplary embodiments of the present invention, by use of the feature that the message counter value in the NM message is set to a specified value (e.g., '1) when one controller transmits the NM message to another controller for the first time, the processor 150 may detect one controller as the first controller and store information related to the first controller when the message counter value set to the specified value is included in the NM message.

When the first controller which is woken up first is detected, in S150, the processor 150 may determine whether the state information of the vehicle is changed for a specified time (time set in a timer, e.g., 10 minutes) after the vehicle is turned off. In S150, the processor 150 may determine whether the states of door open, door locked, trunk open, hood open, driver accommodated, passenger accommodated, vehicle speed, engine, remote service, welcome light, OTA, and the like have changed for a specified time.

When it is determined in S150 that the state information of the vehicle is changed for a specified time after the vehicle is turned off, in S160, the processor may determine that the wake-up of the first controller is normal. In S160, when the first wakeup is a normal wakeup, the processor 150 may perform normal communication in the communication domain without storing the wake-up state information.

When it is determined in S150 that the first controller which is woken up first is detected and the state information of the vehicle is not changed for a specified time after the vehicle is turned off, in S170, the processor 150 may determine that the wake-up of the first controller is abnormal.

When it is determined in S170 that the wake-up of the first controller is abnormal, in S180, the processor 150 may determine whether the sleep entry time of the communication domain exceeds a specified time. In S180, the communication domain for determining the sleep entry time may include a domain in which the first controller operates. In S180, the processor 150 may determine whether the communication domain is in a normal sleep state based on whether the sleep time of the communication domain exceeds a specified time.

When it is determined in S180 that the sleep time of the communication domain does not exceed a specified time, in S190, the processor 150 may determine that the communication domain is in a normal sleep state. Meanwhile, when it is determined in S180 that the sleep time of the communication domain exceeds a specified time (Y), the processor 150 may determine that the first controller is in an abnormal sleep state (non-sleep state).

When it is determined that the first controller is in an abnormal sleep state, in S200, the processor 150 may determine to cut off the power of the first controller to discharge the battery.

When it is determined that the first controller is in an abnormal wake-up state or an abnormal sleep state, in S210, the processor 150 may store information related to the first controller in an abnormal wake-up state, information related to the first controller in an abnormal sleep state, and vehicle state information.

Figure 3:
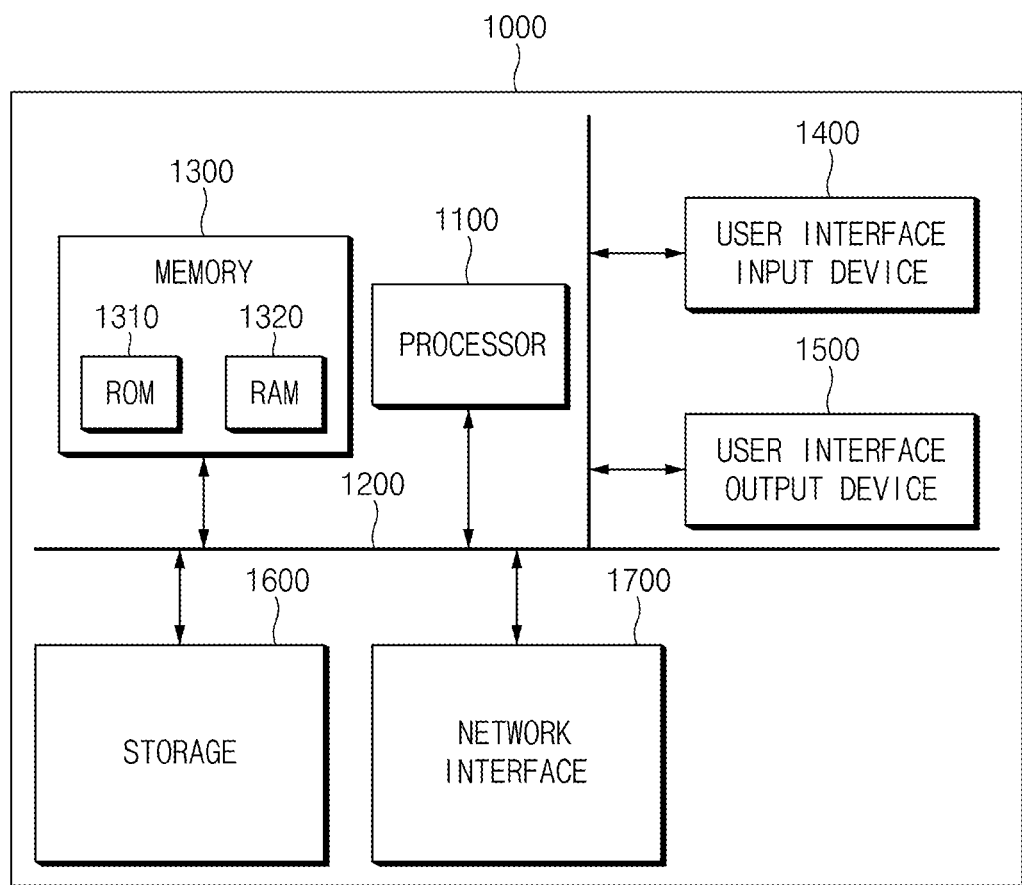
FIG. 3 is a block diagram illustrating a computing system for executing a method according to various exemplary embodiments of the present invention.

FIG. 3 is a block diagram illustrating a computing system for executing a method according to various exemplary embodiments of the present invention.

Referring to FIG. 3, a computing system 1000 may include at least one processor 1100, a memory 1300, a user interface input device 1400, a user interface output device 1500, storage 1600, and a network interface 1700 connected through a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) 1310 and a Random Access Memory (RAM) 1320.

Accordingly, the processes of the method or algorithm described in relation to the exemplary embodiments of the present invention may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the system and method for controlling a vehicle according to various exemplary embodiments of the present invention, it is possible to rapidly detect the cause of the battery being discharged after the vehicle is turned off. Furthermore, it is possible to prevent the battery from being unnecessarily discharged by the controller which is abnormally woken up after the vehicle is turned off, minimizing the consumption of battery power after the vehicle is turned off.

Although exemplary embodiments of the present invention have been described for illustrative purposes, those skilled in the art will appreciate that various modifications, additions and substitutions are possible, without departing from the scope and spirit of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling a vehicle, the apparatus comprising:
    a sensor configured to obtain state information of the vehicle;
    a plurality of controllers configured to operate in at least one communication domain; and
    a processor configured to detect a first controller that wakes up first among the plurality of controllers, wherein the processor is configured to determine whether to cut off power of the first controller according to whether the first controller is in a normal wake-up state based on the state information of the vehicle and whether the first controller is in a normal sleep state based on a sleep entry time of a communication domain,
    wherein the processor is configured to:
        determine whether the sleep entry time of the communication domain exceeds a predetermined time when the processor concludes that the first controller is in an abnormal wake-up state;
        conclude that the first controller is in an abnormal sleep state when the processor determines that the sleep entry time of the communication domain exceeds the predetermined time, and
        cut off the power of the first controller when the processor concludes that the first controller is in the abnormal sleep state.

2. The apparatus of claim 1, wherein one controller of the plurality of controllers is configured to transmit a network management (NM) message to another controller that operates in a same communication domain as a communication domain in which the one controller operates.

3. The apparatus of claim 2, wherein the NM message includes a message counter value set to a predetermined value when the one controller first transmits the NM message to the another controller.

4. The apparatus of claim 3, wherein the processor is configured to detect the one controller as the first controller when the message counter value set to the predetermined value is included in the NM message transmitted from the one controller to the another controller.

5. The apparatus of claim 1, wherein the processor is configured to determine whether the state information of the vehicle is changed for a predetermined time after the vehicle is turned off when the first controller is detected.

6. The apparatus of claim 1, wherein the processor is configured to conclude that the first controller is in the normal wake-up state when the processor determines that the state information of the vehicle is changed for a predetermined time after the vehicle is turned off.

7. The apparatus of claim 1, wherein the processor is configured to conclude that the first controller is in the abnormal wake-up state when the processor determines that the state information of the vehicle is not changed for a predetermined time after the vehicle is turned off.

8. The apparatus of claim 1, wherein the processor is configured to conclude that the first controller is in the normal sleep state when the processor determines that the sleep entry time of the communication domain does not exceed the predetermined time.

9. A method of controlling a vehicle, the method comprising:
    detecting a first controller that wakes up first among a plurality of controllers that operates in at least one communication domain;
    determining whether the first controller is in a normal wake-up state based on state information of the vehicle;
    determining whether the first controller is in a normal sleep state based on a sleep entry time of a communication domain; and
    determining whether to cut off power of the first controller based on whether a wake-up state of the first controller is a normal state and whether the first controller is a sleep state;
    wherein the determining of whether the first controller is in the normal sleep state includes:
        determining whether the sleep entry time of the communication domain exceeds a predetermined time when the processor concludes that the first controller is in an abnormal wake-up state;
        determining that the first controller is in an abnormal sleep state when the processor determines that the sleep entry time of the communication domain exceeds the predetermined time, and
        cutting off the power of the first controller when the processor concludes that the first controller is in the abnormal sleep state.

10. The method of claim 9, wherein one controller of the plurality of controllers is configured to transmit a network management (NM) message to another controller that operates in a same communication domain as a communication domain in which the one controller operates.

11. The method of claim 10, wherein the detecting of the first controller includes:
    detecting the one controller as the first controller when a message counter value set to a predetermined value is included in the NM message transmitted from the one controller to the another controller.

12. The method of claim 9, wherein the determining of whether the first controller is in the normal wake-up state includes:
    determining that the first controller is in the normal wake-up state when the processor determines that the state information of the vehicle is changed for a predetermined time after the vehicle is turned off.

13. The method of claim 9, wherein the determining of whether the first controller is in the normal wake-up state includes:
    determining that the first controller is in the abnormal wake-up state when the processor determines that the state information of the vehicle is not changed for a predetermined time after the vehicle is turned off.

14. The method of claim 9, wherein the determining of whether the first controller is in the normal sleep state includes:
    determining that the first controller is in the normal sleep state when the processor concludes that the sleep entry time of the communication domain does not exceed the predetermined time.

* * * * *